United States Patent
Yang et al.

(10) Patent No.: US 11,053,424 B2
(45) Date of Patent: Jul. 6, 2021

(54) TEMPERATURE-RESISTANT CALCIUM-RESISTANT WATER-BASED DRILLING FLUID FOR OIL AND GAS RESERVOIR PROTECTION AND USE THEREOF

(71) Applicants: CNPC Engineering Technology R&D Company Limited, Beijing (CN); China University of Petroleum (East China), Qingdao (CN)

(72) Inventors: Yuping Yang, Beijing (CN); Jingping Liu, Qingdao (CN); Min Chang, Beijing (CN); Long Li, Beijing (CN); Jinhong Wang, Beijing (CN); Yan Zhang, Beijing (CN); Jinsheng Sun, Beijing (CN)

(73) Assignees: CNPC ENGINEERING TECHNOLOGY R&D COMPANY LIMITED, Beijing (CN); CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 128 days.

(21) Appl. No.: 16/196,511

(22) Filed: Nov. 20, 2018

(65) Prior Publication Data
US 2020/0115613 A1    Apr. 16, 2020

(30) Foreign Application Priority Data

Oct. 15, 2018 (CN) .......................... 201811196158.5

(51) Int. Cl.
| | |
|---|---|
| C09K 8/24 | (2006.01) |
| C01B 32/194 | (2017.01) |
| C01B 32/198 | (2017.01) |
| C08F 220/58 | (2006.01) |
| C08F 226/04 | (2006.01) |
| E21B 21/00 | (2006.01) |
| E21B 21/06 | (2006.01) |
| B82Y 30/00 | (2011.01) |
| B82Y 40/00 | (2011.01) |

(52) U.S. Cl.
CPC .............. *C09K 8/24* (2013.01); *C01B 32/194* (2017.08); *C01B 32/198* (2017.08); *C08F 220/58* (2013.01); *C08F 226/04* (2013.01); *E21B 21/003* (2013.01); *E21B 21/062* (2013.01); *B82Y 30/00* (2013.01); *B82Y 40/00* (2013.01); *C08F 220/585* (2020.02); *C08F 2800/20* (2013.01); *C08F 2810/00* (2013.01); *C09K 2208/10* (2013.01)

(58) Field of Classification Search
CPC ...... C09K 8/24; C09K 2208/10; C09K 8/035; C09K 8/426; C09K 8/467; C09K 8/26; C01B 32/194; C01B 32/198; C08F 220/58; C08F 226/04; C08F 220/585; C08F 2800/20; C08F 2810/00; E21B 21/003; E21B 21/062; B82Y 30/00; B82Y 40/00

See application file for complete search history.

(56) References Cited

U.S. PATENT DOCUMENTS

| | | | | |
|---|---|---|---|---|
| 9,353,305 | B1 * | 5/2016 | Jiang | C09K 8/035 |
| 2013/0156678 | A1 * | 6/2013 | Banerjee | B82Y 30/00 |
| | | | | 423/445 R |
| 2013/0264121 | A1 * | 10/2013 | Young | C09K 8/035 |
| | | | | 175/65 |
| 2017/0058181 | A1 * | 3/2017 | Frantz | C09K 8/5045 |

OTHER PUBLICATIONS

CN dictionary pages, and their translation: Number-average molecular weight (Mn) Dictionary of Chemistry and Chemical Technology (vols. I and II) Eds. Jianqui, C. and Man, X. Chemical Industry Press (2003): 2113.

* cited by examiner

*Primary Examiner* — Kumar R Bhushan
(74) *Attorney, Agent, or Firm* — Volpe Koenig

(57) ABSTRACT

A temperature-resistant calcium-resistant water-based drilling fluid for oil and gas reservoir protection and a use thereof is provided. The water-based drilling fluid contains a filtrate reducer and a plugging agent, wherein the filtrate reducer is a copolymer that contains structural units represented by formula (1), structural units represented by formula (2), and structural units represented by formula (3), wherein, the mass ratio of the structural units represented by formula (1) to the structural units represented by formula (2) to the structural units represented by formula (3) is (0.1-0.2):1: (0.05-0.1), and the number-average molecular weight of the copolymer is 10,000-100,000, the plugging agent is acrylamide-diallyldimethylammonium chloride copolymer modified graphene. The water-based drilling fluid described can exhibit excellent filtrate reducing, plugging, temperature-resistant, anti-collapsing, and reservoir protective performance when it is applied in well drilling in deep high-temperature wells.

10 Claims, No Drawings

TEMPERATURE-RESISTANT CALCIUM-RESISTANT WATER-BASED DRILLING FLUID FOR OIL AND GAS RESERVOIR PROTECTION AND USE THEREOF

CROSS REFERENCE TO RELATED APPLICATIONS

This application claims priority to Chinese Application No. 201811196158.5, filed on Oct. 15, 2018, which is incorporated herein by reference as if fully set forth.

FIELD

The present invention relates to the technical field of well drilling, particularly to a temperature-resistant calcium-resistant water-based drilling fluid for oil and gas reservoir protection and a use of the water-based drilling fluid.

BACKGROUND

As strategic resources, petroleum and natural gas have significant influences on economic security and stable development of a country. As the demand for petroleum and natural gas is increased rapidly and the shallow oil and gas resources are depleted increasingly, the dependence of economic and industrial growth in China on foreign trade of petroleum is increased continuously. Facing the serious situation of energy resources, there is an urgent need for new superseding oil and gas resources. In China, according to the results of the second national oil and gas resource evaluation, the total quantity of oil resources is 94 billion tons, the total quality of conventional gas resources is 38 trillion cubic meters, and the remaining oil and gas resources are mainly distributed in deep strata. Most deep reservoirs in China are deeper than 5,000 m, the depth of the present deepest reservoir is close to 9,000 m, the downhole temperature is 180-260° C., and massive salt-gypsum formations exist in most regions. At present, ultra-deep well drilling is carried out in Daqing, South China Sea, Jilin, Xinjiang, Tarim, Dagang and other oilfields. Drilling fluids that are resistant to ultra-high temperature and high calcium ($CaCl_2 \geq 1\%$) are the key to successful drilling in deep salt-gypsum formations. However, the existing drilling fluids are difficult to meet the requirements for resistance to ultra-high temperature and reservoir protection under the condition of massive salt-gypsum formations. A series of severe technical difficulties incurred by the high temperatures failure of drilling fluid, such as well wall collapsing, jamming of drilling tools, well blowout, and reservoir contamination, etc., are encountered in drilling engineering. In deep well drilling, the high temperatures failure of drilling fluid may result in difficulties in cuttings carrying, suspension of weighting materials, and effective support of the well wall, and may cause severe safety accidents such as well caving, jamming of drilling tools, well blowout, etc., even lead to abandonment of the well. At present, in the use of water-based drilling fluids in drilling of ultra-high temperature wells that involve salt-gypsum formations, the performance of the drilling fluids is mainly maintained by increasing the dosage of treating chemicals. Such an approach not only involves high cost, heavy consumption of treating chemicals and frequent treatment, but also results in complex drilling accidents, severe reservoir contamination, low drilling rate, long drilling cycle, high production safety and public safety risks, and has severe impacts on drilling quality, drilling rate and benefits, and even affects the attainment of geological objectives.

Therefore, it is of great practical significance to make research on filtrate reducers and plugging agents for temperature-resistant calcium-resistant water-based drilling fluids used in oil and gas reservoir protection and drilling fluids that have such properties.

SUMMARY

To overcome the above-mentioned drawbacks in existing water-based drilling fluids, the object of the present invention is to provide a filtrate reducer and a plugging agent for temperature-resistant calcium-resistant water-based drilling fluid for oil and gas reservoir protection and a drilling fluid.

To attain the object described above, the present invention provides a temperature-resistant calcium-resistant water-based drilling fluid for oil and gas reservoir protection, which contains a filtrate reducer and a plugging agent.

The filtrate reducer is a copolymer that contains structural units represented by formula (1), structural units represented by formula (2), and structural units represented by formula (3), wherein the mass ratio of the structural units represented by formula (1) to the structural units represented by formula (2) to the structural units represented by formula (3) is (0.1-0.2):1:(0.05-0.1), and the number-average molecular weight of the copolymer is 10,000-100,000 g/mol;

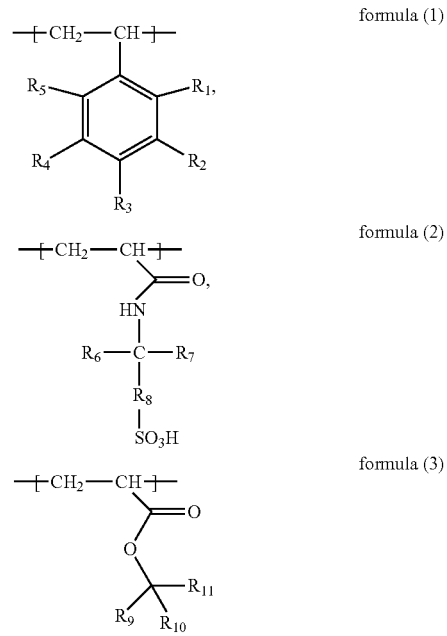

where, $R_1$, $R_2$, $R_3$, $R_4$, $R_5$, $R_6$, $R_7$, $R_9$, $R_{10}$, and $R_{11}$ are each independently H, $C_1$-$C_4$ alkyl, or $C_1$-$C_4$ alkoxy, and $R_8$ is selected from $C_1$-$C_4$ alkylene;

The plugging agent is acrylamide-diallyldimethylammonium chloride copolymer modified graphene.

The present invention further provides a use of the water-based drilling fluid described above in well drilling in a high-temperature high-calcium oil and gas reservoir.

Preferably, the permeability in the high-temperature high-calcium oil and gas reservoir is 100-900 millidarcy.

The water-based drilling fluid described in the present invention is especially applicable to deep salt-gypsum formations drilling, and can exhibit better filtrate reducing, plugging, temperature-resistant, anti-collapsing, and reservoir protection performance. The possible reasons may be: the main chain of the molecule of the filtrate reducer consists of C—C bonds, and the side chains contain structures with strong oxidation resistance, such as C—S and C—N, etc.; a polymer with a main chain consisting of C—C bonds is obtained through copolymerization of monomers with C=C unsaturated double bonds, and the polymer is not easy to degrade at high temperatures owing to the high average bond energy of C—C single bonds (347.3 kJ mol$^{-1}$); sulfonic groups (—SO$_3$H) introduced into the copolymer can thicken the hydrated films on clay particle surfaces, effectively maintain adsorption sites at high temperatures, and improve the thermal stability of the drilling fluid; in addition, since the sulfonic groups do not react with Ca$^{2+}$ to generate precipitate and thus attain a salt-resistant and calcium-resistant effect; moreover, the sulfonic groups can increase zeta potential by increasing the density of negative charges on clay particle surfaces, and thereby increase the electrostatic repulsion among the clay particles and improve the electrostatic stability of the drilling fluid at high temperatures; the benzene ring and similar groups introduced into the copolymer can inhibit the hydrolysis of the molecular chain to a certain degree, and thereby improve the thermal stability and salt resistance of the additives. The filtrate reducer contains a large quantity of hydrophobic groups, which associate with each other into a dynamic physical grid structure under high-temperature and high-salinity conditions, so that there are many physical dynamic cross-linked points in the macromolecular groups, which protect the fine particles in the system and limit the flow of free water in the cross-linked network structure, thereby improve the temperature-resistant and calcium-resistant performance of the drilling fluid, and reduce the filtrate loss of the drilling fluid system. The dynamic physical grid structure can also adhere to the surfaces of mud cakes via the hydrophilic sulfonate groups and amide groups, making the mud cakes densified and further reducing the filtrate loss of the drilling fluid. In addition, the hydrophilic sulfonate groups in the filtrate reducer can adhere to the surface of reservoir rock, while the hydrophobic groups protrude outwards away from the rock surface, endowing the rock surface with a hydrophobic film, which can inhibit infiltration of free water in the drilling fluid into the reservoir.

The hydrophilic acrylamid-diallyldimethylammonium chloride copolymer chain segments included in the plugging agent contain amino groups, and have a strong ability to inhibit clay mineral expansion and dispersion; in addition, the modified graphene organically combines the rigidity, dimensional stability and thermal stability of graphene with the properties of acrylamide-diallyldimethylammonium chloride copolymer, and obtains significantly improved plugging and dispersion performance on the basis of the original excellent properties of graphene; thus, when the modified graphene is used as a plugging agent for drilling fluid, it attains significant plugging and filtrate loss reduction effects in high-temperature and high-calcium environments, and thereby inhibits infiltration of free water in the drilling fluid into the reservoir and protects the reservoir free from the damages of the drilling fluid.

DETAILED DESCRIPTION OF THE EMBODIMENTS

Hereunder some embodiments of the present invention will be detailed. It should be appreciated that the embodiments described here are only provided to describe and explain the present invention, but shall not be deemed as constituting any limitation to the present invention.

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined with each other to obtain one or more new numeric ranges, which shall be deemed as having been disclosed specifically in this document.

The present invention provides a temperature-resistant calcium-resistant water-based drilling fluid for oil and gas reservoir protection, which contains a filtrate reducer and a plugging agent.

The filtrate reducer is a copolymer that contains structural units represented by formula (1), structural units represented by formula (2), and structural units represented by formula (3), wherein the mass ratio of the structural units represented by formula (1) to the structural units represented by formula (2) to the structural units represented by formula (3) is (0.1-0.2):1:(0.05-0.1), and the number-average molecular weight of the copolymer is 10,000-100,000

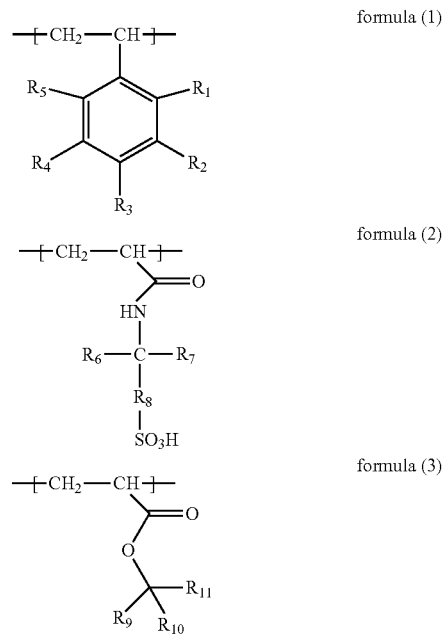

where, $R_1$, $R_2$, $R_3$, $R_4$, $R_5$, $R_6$, $R_7$, $R_9$, $R_{10}$, and $R_{11}$ are each independently H, $C_1$-$C_4$ alkyl, or $C_1$-$C_4$ alkoxy, and $R_8$ is selected from $C_1$-$C_4$ alkylene.

The plugging agent is acrylamide-diallyldimethylammonium chloride copolymer modified graphene.

In the water-based drilling fluid described in the present invention, measured on the basis of 100 mL said water-based drilling fluid, the content of the filtrate reducer is 1-3 g, and the content of the plugging agent is 2-7 g.

In the water-based drilling fluid described in the present invention, preferably, in the filtrated reducer, $R_1$, $R_2$, $R_3$, $R_4$, $R_5$, $R_6$, $R_7$, $R_9$, $R_{10}$, and $R_{11}$ are each independently H, methyl, ethyl, methoxy, or ethyoxy; $R_8$ is selected from methylene or ethylidene.

More preferably, $R_1$, $R_2$, $R_3$, $R_4$, and $R_5$ are each independently H, methyl, or ethyl; $R_6$, $R_7$, $R_9$, $R_{10}$, and $R_{11}$ are methyl; $R_8$ is methylene.

In the water-based drilling fluid described in the present invention, the mass ratio of the structural units represented by formula (1) to the structural units represented by formula (2) to the structural units represented by formula (3) in the filtrate reducer is (0.1-0.2):1:(0.05-0.1), preferably is (0.1-0.15):1:(0.05-0.075), more preferably is (0.12-0.15):1:(0.055-0.07).

In the water-based drilling fluid described in the present invention, the preparation method of the filtrate reducer comprises: controlling a monomer M1 represented by formula (4), a monomer M2 represented by formula (5), and a monomer M3 represented by formula (6) to have a polymerization reaction in water that serves as a solvent in the presence of sodium dodecyl sulfate and 2,2'-azobis(2-methylpropionamidine) dihydrochloride,

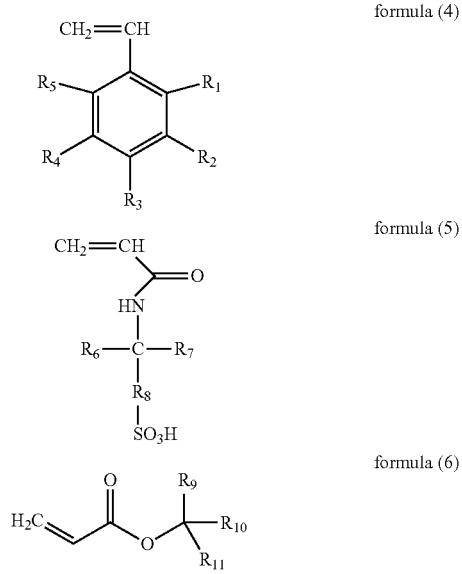

formula (4)

formula (5)

formula (6)

where, $R_1$, $R_2$, $R_3$, $R_4$, $R_5$, $R_6$, $R_7$, $R_9$, $R_{10}$, and $R_{11}$ are each independently H, $C_1$-$C_4$ alkyl, or $C_1$-$C_4$ alkoxy, preferably are each independently H, methyl, ethyl, methoxy, or ethoxy; $R_8$ is selected from $C_1$-$C_4$ alkylene, preferably is methylene or ethylidene.

In the preparation method of the filtrate reducer described above, the dosed mass ratio of the monomer M1 to the monomer M2 to the monomer M3 is (0.1-0.2):1:(0.05-0.1), preferably is (0.1-0.15):1:(0.05-0.075), more preferably is (0.12-0.15):1:(0.055-0.07).

In the preparation method of the filtrate reducer described above, the dosed mass ratio of the monomer M2 to the sodium dodecyl sulfate to the 2,2'-azobis(2-methylpropionamidine) dihydrochloride may be (100-200):(0.3-0.6):(0.2-0.6), preferably is (100-200):(0.3-0.5):(0.2-0.4).

In the preparation method of the filtrate reducer described above, the polymerization reaction is performed under operating conditions that ensure the number-average molecular weight of the prepared copolymer is 10,000-100,000 g/mol, preferably is 30,000-50,000 g/mol.

Preferably, the operating conditions of the polymerization reaction include: temperature: 40-120° C., more preferably 60-100° C., optimally 80° C.; time: 1-10 h, more preferably 3-7 h, optimally 5 h.

According to a preferred embodiment of the preparation method of the filtrate reducer described above, the filtrate reducer may be prepared through the following steps:

(1) dissolving the sodium dodecyl sulfate in water to obtain a first aqueous solution;

(2) dissolving the monomer M1, the monomer M2, and the monomer M3 in water to obtain a second aqueous solution;

(3) dissolving the 2,2'-azobis(2-methylpropionamidine) dihydrochloride in water to obtain a third aqueous solution;

(4) controlling the first aqueous solution and the second aqueous solution to mix with each other at 40-120° C. temperature under nitrogen shielding to obtain a mixed solution, and then adding dropwise the third aqueous solution into the mixed solution, reacting for 1-10 h.

In the step (1), the dissolution process of the sodium dodecyl sulfate preferably is performed in a water bath at 40-120° C. temperature, optimally at 80° C. temperature.

In the step (1) to step (3), the water used for dissolution may be deionized water or distilled water respectively, preferably is distilled water.

The operating process in the step (4) may comprise: adding the first aqueous solution into a reaction vessel while stirring (e.g., magnetic stirring), then adding the second aqueous solution and stirring for 10-60 min. under nitrogen shielding, and then adding dropwise the third aqueous solution for reaction. The reaction vessel may be a conventional reaction vessel in the art, such as a three-neck flask.

In the preparation method of the filtrate reducer described above, the nitrogen shielding is implemented by: charging nitrogen for shielding at a rate that ensures about two bubbles float up per second.

In the water-based drilling fluid described in the present invention, in the acrylamide-diallyldimethylammonium chloride copolymer modified graphene, the molar ratio of structural units provided by acrylamide to structural units provided by diallyldimethylammonium chloride is 1:(5-15); specifically, for example, the molar ratio may be 1:5, 1:6, 1:7, 1:8, 1:9, 1:10, 1:11, 1:12, 1:13, 1:14, 1:5, or any value within a range constituted by any two of those point values. Preferably, the molar ratio of structural units provided by acrylamide to structural units provided by diallyldimethylammonium chloride is 1:(8-10).

Preferably, in the acrylamide-diallyldimethylammonium chloride copolymer modified graphene, the number-average molecular weight of the acrylamide-diallyldimethylammonium chloride copolymer is 15,000-30,000 g/mol, more preferably is 16,000-28,000 g/mol, further preferably is 18,000-25,000 g/mol. In the present invention, the "number-average molecular weight" is measured by means of gel permeation chromatography (GPC), and the laboratory instrument used is a GPC Model E2695 from Waters Corporation, USA.

In the water-based drilling fluid described in the present invention, the acrylamide-diallyldimethylammonium chloride copolymer modified graphene is prepared by the following method: dispersing graphene oxide by ultrasonic dispersion in water to obtain dispersion liquid, and controlling the dispersion liquid to react with acrylamide-diallyldimethylammonium chloride copolymer and hydrazine hydrate.

In the preparation process of the acrylamide-diallyldimethylammonium chloride copolymer modified graphene described above, the dosed weight ratio of the graphene oxide to the acrylamide-diallyldimethylammonium chloride copolymer to the hydrazine hydrate is 1:(4.8-5.3):(60-80), preferably is 1:(4.9-5.2):(65-76), further preferably is 1:(5-5.1):(68-73).

Preferably, in the preparation process of the acrylamide-diallyldimethylammonium chloride copolymer modified graphene, the concentration of graphene oxide in the dispersion liquid is 0.5-2.2 mg/mL, preferably is 1-2 mg/mL; and/or the acrylamide-diallyldimethylammonium chloride copolymer is added in a form of solution, and the concentration of the acrylamide-diallyldimethylammonium chloride copolymer solution may be 0.4-0.6 wt %, preferably is 0.45-0.55 wt %, further preferably is 0.5-0.52 wt %.

In the preparation process of the acrylamide-diallyldimethylammonium chloride copolymer modified graphene described above, the process of the reaction comprises: adding the acrylamide-diallyldimethylammonium chloride copolymer in a form of solution into the dispersion liquid and stirring for 15-50 min. (preferably 20-40 min.) first, and then adding the hydrazine hydrate to obtain a mixture, and controlling the mixture to have reaction for 1-10 h (preferably 2-5 h) in a water bath at 65-95° C. (preferably 70-90° C.) constant temperature.

The method for preparing the acrylamide-diallyldimethylammonium chloride copolymer modified graphene preferably further comprises preparing graphene oxide according to the following procedures:

mixing graphite powder with $NaNO_3$ to obtain a mixture, then adding concentrated $H_2SO_4$ into the mixture and stirring in an ice water bath, next adding $KMnO_4$ into the resultant mixture and stirring the mixture at a temperature equal to or lower than 4° C. for reaction, then increasing the water bath temperature to 30-45° C. and holding at this temperature for reaction, next adding dropwise water into the resultant mixture and increasing the water bath temperature to 90-100° C. for further reaction, finally adding water to dilute the mixture, adding $H_2O_2$ and hydrochloric acid into the mixture after the temperature of the mixture drops to 60° C. or lower, and stirring for reaction, washing the reaction product with water by centrifugal washing till the pH of the solution is neutral after the reaction is finished, and then drying the resultant reaction product.

In the preparation process of the graphene oxide, the dosed mass ratio of the $KMnO_4$ to the $NaNO_3$ to the graphite powder may be (2.8-3.5):(0.8-1.3):1, preferably is (2.9-3.3):(0.9-1.2):1, further preferably is (3-3.2):(1-1.1):1.

In the preparation process of the graphene oxide, the dose ratio of the graphite powder to the concentrated $H_2SO_4$ may be 1 g:(20-27.5) mL, preferably is 1 g:(21.5-26.5) mL, further preferably is 1 g:(22.5-25.5) mL. In the present invention, the concentrated $H_2SO_4$ refers to a $H_2SO_4$ aqueous solution having a concentration of 70 wt % or more, e.g., 70-90 wt %.

In the preparation process of the graphene oxide, the dose ratio of the graphite powder to the $H_2O_2$ may be 1 g:(4.5-5.6) mL, preferably is 1 g:(4.8-5.5) mL, further preferably is 1 g:(5-5.3) mL.

According to a preferred embodiment of the synthesis process of the acrylamide-diallyldimethylammonium chloride copolymer modified graphene, the acrylamide-diallyldimethylammonium chloride copolymer modified graphene may be prepared through the following steps:

(1) mixing graphite powder with $NaNO_3$ to obtain a mixture, then adding concentrated $H_2SO_4$ into the mixture and stirring for 0.5-1.5 h in an ice water bath, next adding $KMnO_4$ into the resultant mixture and stirring the mixture for 0.5-5 h at a temperature equal to or lower than 4° C. for reaction, then increasing the water bath temperature to 30-45° C. and holding at this temperature for 1.5-6 h for reaction, next adding dropwise water into the resultant mixture and increasing the water bath temperature to 90-100° C. and holding at this temperature for 0.5-5 h for further reaction, finally adding water to dilute the mixture, adding $H_2O_2$ and hydrochloric acid into the mixture after the temperature of the mixture drops to 60° C. or lower, and stirring for 10-60 min. for reaction, washing the reaction product with water by centrifugal washing till the pH of the solution is neutral after the reaction is finished, and then drying the resultant reaction product by vacuum drying at 40-65° C., to obtain graphene oxide;

(2) dispersing the graphene oxide by ultrasonic dispersion in water to prepare 0.5-2.2 mg/mL dispersion liquid; adding acrylamide-diallyldimethylammonium chloride copolymer solution having a concentration of 0.4-0.6 wt % into the dispersion liquid and stirring for 15-50 min., and then adding hydrazine hydrate to obtain a mixture, and controlling the mixture to react for 1-10 h in a water bath at 65-95° C. constant temperature; separating the reaction product by centrifugal separation, washing the reaction product with water, and then drying the resultant reaction product by vacuum drying at 40-65° C., to obtain acrylamide-diallyldimethylammonium chloride copolymer modified graphene.

In the water-based drilling fluid described in the present invention, the content of the filtrate reducer is 0.1-5%, preferably is 1-3%, based on the total weight of the water-based drilling fluid.

In the water-based drilling fluid described in the present invention, the content of the acrylamide-diallyldimethylammonium chloride copolymer modified graphene is 0.2-9%, preferably is 0.3-3%, based on the total weight of the water-based drilling fluid.

The water-based drilling fluid typically further contains other additives for water-based drilling fluids, besides water the above-mentioned copolymer and modified graphene. Preferably, the said other additives are selected from bentonite, amine inhibitor, sulfomethylated phenolic resin, polyethylene glycol, polyanionic cellulose, KCOOH and sodium carbonate.

Wherein the bentonite refers to a clay with montmorillonite as the main mineral component, which can render viscous shearing strength, filter loss wall building property to the drilling fluid; for example, the bentonite may be sodium bentonite and/or calcium bentonite, preferably is sodium bentonite. More preferably, the content of the bentonite is 1-4 wt %, and even more preferably is 2-3 wt %.

Wherein the content of the amine inhibitor may be 1-3 wt %; the content of the sulfomethylated phenolic resin may be 2-4 wt %; the content of the polyethylene glycol may be 2-7 wt %; the content of the polyanionic cellulose may be 0.5-3 wt %; the content of the KCOOH may be 1-6 wt %; the content of the sodium carbonate may be 0.1-0.5 wt %.

The above additives may be commercially available products, or may be prepared by conventional methods in the art. They will not be further detailed hereunder.

The present invention further provides a use of the water-based drilling fluid described above in well drilling in high-temperature high-calcium oil and gas reservoirs. The permeability of the water-based drilling fluid described in the present invention in high-temperature and high-calcium oil and gas reservoirs is 100-900 millidarcy.

Hereunder the present invention will be detailed in some examples, but it should be noted that the present invention is not limited to those examples.

Preparation Example 1

The temperature of water bath is adjusted to 80° C., sodium dodecyl sulfate is dissolved in distilled water, and then the solution is poured into a three-neck flask and stirred by magnetic stirring at an appropriate stirring rate for 15 min.; 100 g distilled water is added into a 100 ml beaker, a monomer M1 represented by formula (4-1), a monomer M2 represented by formula (5-1), and a monomer M3 represented by formula (6-1) are added into the beaker respectively. After these substances are dissolved fully, the solution is poured into a three-neck flask, and is stirred for 30 min. under nitrogen shielding; 2,2'-azobis(2-methylpropionamidine) dihydrochloride is dissolved in distilled water, and then the resultant solution is added dropwise into the three-neck flask, wherein the mass ratio of the monomer M1 to the monomer M2 to the monomer M3 is 0.15:1:0.075, and the mass ratio of the monomer M2 to the sodium dodecyl sulfate to the 2,2'-azobis(2-methylpropionamidine) dihydrochloride is 200:0.5:0.4. A copolymer A1 is obtained after reaction for 5 h; the number-average molecular weight of the copolymer is 42,000.

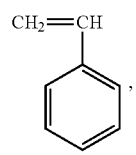

formula (4-1)

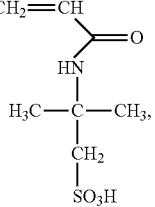

formula (5-1)

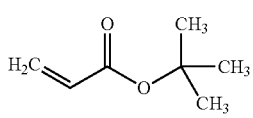

formula (6-1)

Preparation Example 2

The temperature of water bath is adjusted to 80° C., sodium dodecyl sulfate is dissolved in distilled water, and then the solution is poured into a three-neck flask and stirred by magnetic stirring at an appropriate stirring rate for 15 min.; 100 g distilled water is added into a 100 ml beaker, a monomer M1 represented by formula (4-2), a monomer M2 represented by formula (5-1), and a monomer M3 represented by formula (6-1) are added into the beaker respectively. After these substances are dissolved fully, the solution is poured into a three-neck flask, and is stirred for 30 min. under nitrogen shielding; 2,2'-azobis(2-methylpropionamidine) dihydrochloride is dissolved in distilled water, and then the resultant solution is added dropwise into the three-neck flask, wherein the mass ratio of the monomer M1 to the monomer M2 to the monomer M3 is 0.1:1:0.05, and the mass ratio of the monomer M2 to the sodium dodecyl sulfate to the 2,2'-azobis(2-methylpropionamidine) dihydrochloride is 100:0.3:0.2. A copolymer A2 is obtained after reaction for 5 h; the number-average molecular weight of the copolymer is 20,000.

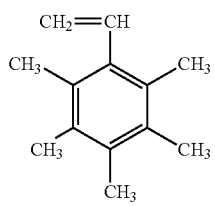

formula (4-2)

Preparation Example 3

The temperature of water bath is adjusted to 80° C., sodium dodecyl sulfate is dissolved in distilled water, and then the solution is poured into a three-neck flask and stirred by magnetic stirring at an appropriate stirring rate for 15 min.; 100 g distilled water is added into a 100 ml beaker, a monomer M1 represented by formula (4-3), a monomer M2 represented by formula (5-1), and a monomer M3 represented by formula (6-1) are added into the beaker respectively. After the substances are dissolved fully, the solution is poured into a three-neck flask, and is stirred for 30 min. under nitrogen shielding; 2,2'-azobis(2-methylpropionamidine) dihydrochloride is dissolved in distilled water, and then the resultant solution is added dropwise into the three-neck flask, wherein the mass ratio of the monomer M1 to the monomer M2 to the monomer M3 is 0.2:1:0.1, and the mass ratio of the monomer M2 to the sodium dodecyl sulfate to the 2,2'-azobis(2-methylpropionamidine) dihydrochloride is 100:0.6:0.6. A copolymer A3 is obtained after reaction for 5 h; the number-average molecular weight of the copolymer is 15,000.

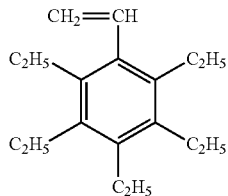

formula (4-3)

Comparative Preparation Example 1

A copolymer is prepared according to the method described in Preparation Example 1, but the monomer M1 is not added; thus, a copolymer D1 is obtained.

Comparative Preparation Example 2

A copolymer is prepared according to the method described in Preparation Example 1, but the monomer M2 is not added; thus, a copolymer D2 is obtained.

Comparative Preparation Example 3

A copolymer is prepared according to the method described in Preparation Example 1, but the monomer M3 is not added; thus, a copolymer D3 is obtained.

Preparation Example 4

(1) Preparation of Graphene Oxide 1 g graphite powder is mixed with 1 g $NaNO_3$ to obtain a mixture, then 22.5 mL concentrated $H_2SO_4$ is added into the mixture and the mixture is stirred in an ice water bath, next 3 g $KMnO_4$ is added into the resultant mixture and this mixture is stirred at a temperature equal to or lower than 4° C. for 2 h for reaction, then the water bath temperature is increased to 35° C. and held at the temperature for 3 h for reaction, next 45 mL water is added dropwise into the resultant mixture and the water bath temperature is increased to 90° C. and held at the temperature for 2 h for further reaction, finally 200 mL water is added to dilute the mixture, 5 mL $H_2O_2$ and 200 mL 5 wt % hydrochloric acid are added into the mixture after the temperature of the mixture drops to 60° C. or lower, and the mixture is stirred for 30 min. for reaction, the reaction product is washed with water by centrifugal washing till the pH of the solution is neutral after the reaction is finished, and then the resultant reaction product is dried by vacuum drying at 60° C., to obtain graphene oxide.

(2) Preparation of Modified Graphene 0.03 g graphene oxide obtained above is dispersed by ultrasonic dispersion in water to prepare 1 mg/mL dispersion liquid; 30 mL 0.5 wt % solution of acrylamide-diallyldimethylammonium chloride copolymer (the number-average molecular weight is 20,000, and the molar ratio of structural unit provided by acrylamide to structural units provided by diallyldimethylammonium chloride is 1:9) is added into the dispersion liquid, the resultant mixture is stirred for 30 min., and then 2 mL hydrazine hydrate is added into the mixture, and the mixture is kept in a water batch at 80° C. constant temperature for 3 h for reaction. The reaction product is separated by centrifugal separation, washed with water, and then dried by vacuum drying at 60° C., to obtain acrylamide-diallyldimethylammonium chloride copolymer modified graphene B1.

Preparation Example 5

(1) Preparation of Graphene Oxide 1 g graphite powder is mixed with 1.2 g $NaNO_3$ to obtain a mixture, then 27.5 mL concentrated $H_2SO_4$ is added into the mixture and the mixture is stirred in an ice water bath, next 2.8 g $KMnO_4$ is added into the resultant mixture and this mixture is stirred at a temperature equal to or lower than 4° C. for 5 h for reaction, then the water bath temperature is increased to 30° C. and held at the temperature for 6 h for reaction, next 45 mL water is added dropwise into the resultant mixture and the water bath temperature is increased to 98° C. and held at the temperature for 0.5 h for further reaction, finally 180 mL water is added to dilute the mixture, 5.5 mL $H_2O_2$ and 220 mL 4 wt % hydrochloric acid are added into the mixture after the temperature of the mixture drops to 60° C. or lower, and the mixture is stirred for 50 min. for reaction, the reaction product is washed with water by centrifugal washing till the pH of the solution is neutral after the reaction is finished, and then the resultant reaction product is dried by vacuum drying at 65° C., to obtain graphene oxide.

(2) Preparation of Modified Graphene 0.03 g graphene oxide obtained above is dispersed by ultrasonic dispersion in water to prepare 2 mg/mL dispersion liquid; 35 mL 0.48 wt % solution of acrylamide-diallyldimethylammonium chloride copolymer (the number-average molecular weight is 25,000, and the molar ratio of structural unit provided by acrylamide to structural units provided by diallyldimethylammonium chloride is 1:10) is added into the dispersion liquid, the resultant mixture is stirred for 15 min., and then 2.1 mL hydrazine hydrate is added into the mixture, and the mixture is kept in water batch at 95° C. constant temperature for 1 h for reaction. The reaction product is separated by centrifugal separation, washed with water, and then dried by vacuum drying at 40° C., to obtain acrylamide-diallyldimethylammonium chloride copolymer modified graphene B2.

Preparation Example 6

(1) Preparation of Graphene Oxide 1 g graphite powder is mixed with 0.8 g $NaNO_3$ to obtain a mixture, then 20 mL concentrated $H_2SO_4$ is added into the mixture and the mixture is stirred in an ice water bath, next 3.5 g $KMnO_4$ is added into the resultant mixture and the mixture is stirred at a temperature equal to or lower than 4° C. for 0.5 h for reaction, then the water bath temperature is increased to 45° C. and held at the temperature for 1.5 h for reaction, next 50 mL water is added dropwise into the resultant mixture and the water bath temperature is increased to 95° C. and held at the temperature for 3.5 h for further reaction, finally 250 mL water is added to dilute the mixture, 4.5 mL $H_2O_2$ and 250 mL 4 wt % hydrochloric acid are added into the mixture after the temperature of the mixture drops to 60° C. or lower, and the mixture is stirred for 50 min. for reaction, the reaction product is washed with water by centrifugal washing till the pH of the solution is neutral after the reaction is finished, and then the resultant reaction product is dried by vacuum drying at 40° C., to obtain graphene oxide.

(2) Preparation of Modified Graphene 0.03 g graphene oxide obtained above is dispersed by ultrasonic dispersion in water to prepare 0.5 mg/mL dispersion liquid; 28 mL 0.52 wt % solution of acrylamide-diallyldimethylammonium chloride copolymer (the number-average molecular weight is 18,000, and the molar ratio of structural unit provided by acrylamide to structural units provided by diallyldimethylammonium chloride is 1:8) is added into the dispersion liquid, the resultant mixture is stirred for 50 min., and then 1.9 mL hydrazine hydrate is added into the mixture, and the mixture is kept in water batch at 65° C. constant temperature for 10 h for reaction. The reaction product is separated by centrifugal separation, washed with water, and then dried by vacuum drying at 65° C., to obtain acrylamide-diallyldimethylammonium chloride copolymer modified graphene B3.

Comparative Preparation Example 4

Modified graphene is prepared according to the method described in Preparation Example 4, but hydrazine hydrate is not added in the step (2); thus, acrylamide-diallyldimethylammonium chloride copolymer modified graphene D4 is obtained.

Comparative Preparation Example 5

Modified graphene is prepared according to the method described in Preparation Example 4, but 30 mL 0.5 wt % solution of Poly(diallyldimethylammonium chloride) having a number-average molecular weight of 20,000 is used to replace the solution of acrylamide-diallyldimethylammonium chloride copolymer in the step (2); thus, Poly(diallyldimethylammonium chloride) modified graphene D5 is obtained.

Comparative Preparation Example 6

Modified graphene is prepared according to the method described in Preparation Example 4, but 30 mL 0.5 wt % solution of polyacrylamide having a number-average molecular weight of 20,000 is used to replace the solution of acrylamide-diallyldimethylammonium chloride copolymer in the step (2); thus, polyacrylamide modified graphene D6 is obtained.

Comparative Preparation Example 7

Modified graphene is prepared according to the method described in Preparation Example 4, but the molar ratio of structural units provided by acrylamide to structural units provided by diallyldimethylammonium chloride in the acrylamide-diallyldimethylammonium chloride copolymer used in the step (2) is 1:18; thus, acrylamide-diallyldimethylammonium chloride copolymer modified graphene D7 is obtained.

Comparative Preparation Example 8

Modified graphene is prepared according to the method described in Preparation Example 4, but the molar ratio of structural units provided by acrylamide to structural units provided by diallyldimethylammonium chloride in the acrylamide-diallyldimethylammonium chloride copolymer used in the step (2) is 1:4; thus, acrylamide-diallyldimethylammonium chloride copolymer modified graphene D8 is obtained.

Example 1

A drilling fluid F1 is prepared according to the following recipe: 3% copolymer A1, 3% acrylamide-diallyldimethylammonium chloride copolymer modified graphene B1, 2% sodium bentonite, 2% amine inhibitor (from Chengdu Chunfeng Petroleum Technology Co., Ltd.), 3% sulfomethylated phenolic resin (from Chengdu Chunfeng Petroleum Technology Co., Ltd.), 4% polyethylene glycol-4000, 0.5% PAC (polyanionic cellulose from Shandong Yanggu Jiangbei Chemical Co., Ltd.), 2% KCOOH, 0.3% $Na_2CO_3$, and water that accounts for the remaining content. The above-mentioned percentages in the drilling fluid are mass-volume ratios; for example, 3% copolymer A1 refers to that 3 g copolymer A1 is added in 100 ml drilling fluid.

Example 2

A drilling fluid F2 is prepared according to the following recipe: 1% copolymer A2, 7% acrylamide-diallyldimethylammonium chloride copolymer modified graphene B2, 3% sodium bentonite, 1% amine inhibitor (from Chengdu Chunfeng Petroleum Technology Co., Ltd.), 2% sulfomethylated phenolic resin (from Chengdu Chunfeng Petroleum Technology Co., Ltd.), 2% polyethylene glycol-4000, 3% PAC (a polyanionic cellulose from Shandong Yanggu Jiangbei Chemical Co., Ltd.), 1% KCOOH, 0.1% $Na_2CO_3$, and water that accounts for the remaining content. The above-mentioned percentages in the drilling fluid are mass-volume ratios; for example, 1% copolymer A2 refers to that 1 g copolymer A2 is added in 100 ml drilling fluid.

Example 3

A drilling fluid F3 is prepared according to the following recipe: 2% copolymer A3, 2% acrylamide-diallyldimethylammonium chloride copolymer modified graphene B3, 4% sodium bentonite, 3% amine inhibitor (from Chengdu Chunfeng Petroleum Technology Co., Ltd.), 4% sulfomethylated phenolic resin (from Chengdu Chunfeng Petroleum Technology Co., Ltd.), 7% polyethylene glycol-4000, 2% PAC (a polyanionic cellulose from Shandong Yanggu Jiangbei Chemical Co., Ltd.), 6% KCOOH, 0.5% $Na_2CO_3$, and water that accounts for the remaining content. The above-mentioned percentages in the drilling fluid are mass-volume ratios; for example, 2% copolymer A3 refers to that 2 g copolymer A3 is added in 100 ml drilling fluid.

Comparative Example 1

A water-based drilling fluid is prepared according to the method described in Example 1, but the copolymer A1 and the acrylamide-diallyldimethylammonium chloride copolymer modified graphene B1 are not added; thus, a water-based drilling fluid DF1 is obtained.

Comparative Example 2

A water-based drilling fluid is prepared according to the method described in Example 1, but the copolymer A1 is not added; thus, a water-based drilling fluid DF2 is obtained.

Comparative Example 3

A water-based drilling fluid is prepared according to the method described in Example 1, but the copolymer A1 is replaced with 3% sulfonated resin; thus, a water-based drilling fluid DF3 is obtained.

Comparative Example 4

A water-based drilling fluid is prepared according to the method described in Example 1, but the acrylamide-diallyldimethylammonium chloride copolymer modified graphene B1 is not added; thus, a water-based drilling fluid DF4 is obtained.

Comparative Example 5

A water-based drilling fluid is prepared according to the method described in Example 1, but the acrylamide-diallyldimethylammonium chloride copolymer modified graphene B1 is replaced with 3% sulfonated lignite resin (SPNH from Chengdu Chunfeng Petroleum Technology Co., Ltd.); thus, a water-based drilling fluid DF5 is obtained.

Comparative Examples 6-8

Water-based drilling fluids are prepared according to the method described in Example 1, but the copolymer A1 is replaced with 3% copolymers D1-D3 respectively; thus, water-based drilling fluids DF6-DF8 are obtained respectively.

Comparative Examples 9-13

Water-based drilling fluid is prepared according to the method described in Example 1, but the acrylamide-diallyldimethylammonium chloride copolymer modified graphene B1 is replaced with 3% modified graphene D4-D8 respectively; thus, water-based drilling fluids DF9-DF13 are obtained respectively.

Test Case 1

The above-mentioned water-based drilling fluids F1-F3 and DF1-DF13 are sampled in 400 mL volume respectively, 1.0 wt % $CaCl_2$ is added into each of the water-based drilling fluids; each drilling fluid is stirred for 20 min. at 5,000 rpm stirring rate, and then is loaded into an aging can, the aging can is loaded into a roller hearth, and is rolled for 16 h at a constant temperature of 200° C.; then, the aging can is taken out from the roller hearth and cooled to room temperature; next, the drilling fluid is stirred for 20 min. at 5,000 rpm stirring rate again, and then the apparent viscosity (AV, MPa·s), plastic viscosity (PV, MPa·s), yield point (YP, Pa), 10 s and 10 min. gel strengths, and API filtrate loss at medium pressure ($FL_{API}$, mL), and filtrate loss at high temperature and high pressure ($FL_{HTHP}$, mL, @200° C.) of each drilling fluid are measured respectively as per GB/T16783.1-2006. The results are shown in Table 1.

TABLE 1

| Water-based drilling fluid | Test Condition | AV MPa·s | PV MPa·s | YP Pa | $FL_{API}$ mL | $FL_{HTHP}$ mL |
|---|---|---|---|---|---|---|
| F1 | Before aging | 51 | 35 | 16 | 1.8 | — |
|  | After aging | 43 | 29 | 14 | 2.2 | 17.6 |
| F2 | Before aging | 52 | 36 | 17 | 2.2 | — |
|  | After aging | 44 | 30 | 14 | 2.8 | 18.0 |
| F3 | Before aging | 50 | 36 | 14 | 2.6 | — |
|  | After aging | 43 | 30 | 13 | 3.0 | 18.2 |
| DF1 | Before aging | 37 | 24 | 13 | 5.6 | — |
|  | After aging | 26 | 18 | 8 | 8.4 | 47.2 |

TABLE 1-continued

| Water-based drilling fluid | Test Condition | AV MPa·s | PV MPa·s | YP Pa | $FL_{API}$ mL | $FL_{HTHP}$ mL |
|---|---|---|---|---|---|---|
| DF2 | Before aging | 46 | 32 | 14 | 3.0 | — |
|  | After aging | 39 | 25 | 14 | 4.6 | 22.4 |
| DF3 | Before aging | 54 | 36 | 18 | 2.5 | — |
|  | After aging | 46 | 31 | 15 | 3.2 | 20.6 |
| DF4 | Before aging | 48 | 33 | 15 | 2.6 | — |
|  | After aging | 40 | 28 | 12 | 3.4 | 20.8 |
| DF5 | Before aging | 53 | 36 | 17 | 2.1 | — |
|  | After aging | 44 | 30 | 14 | 2.8 | 20.2 |
| DF6 | Before aging | 52 | 35 | 17 | 2.0 | — |
|  | After aging | 43 | 31 | 12 | 2.6 | 20.0 |
| DF7 | Before aging | 50 | 34 | 16 | 2.5 | — |
|  | After aging | 40 | 28 | 12 | 3.2 | 20.4 |
| DF8 | Before aging | 51 | 35 | 16 | 2.2 | — |
|  | After aging | 41 | 28 | 13 | 2.8 | 20.2 |
| DF9 | Before aging | 52 | 36 | 16 | 2.4 | — |
|  | After aging | 43 | 30 | 13 | 3.2 | 20.4 |
| DF10 | Before aging | 56 | 39 | 17 | 2.4 | — |
|  | After aging | 44 | 31 | 13 | 3.2 | 20.0 |

TABLE 1-continued

| Water-based drilling fluid | Test Condition | AV MPa·s | PV MPa·s | YP Pa | $FL_{API}$ mL | $FL_{HTHP}$ mL |
|---|---|---|---|---|---|---|
| DF11 | Before aging | 54 | 38 | 16 | 2.6 | — |
|  | After aging | 43 | 31 | 12 | 3.4 | 20.6 |
| DF12 | Before aging | 52 | 37 | 15 | 2.0 | — |
|  | After aging | 41 | 30 | 11 | 2.6 | 20.2 |
| DF13 | Before aging | 55 | 38 | 17 | 2.2 | — |
|  | After aging | 43 | 30 | 13 | 2.9 | 20.4 |

It is seen from Table 1: the water-based drilling fluid provided in the present invention still has relatively low API filtrate loss and HTHP filtrate loss under the condition of 1.0 wt % $CaCl_2$, so it indicates that the water-based drilling fluid provided in the present invention meets the requirement for high temperature resistance (at 200° C.) under the condition of 1.0 wt % $CaCl_2$.

Test Case 2

The reservoir protection performance of the water-based drilling fluids F1-F3 and DF1-DF13 are tested as per SYT6540-2002 "Lab Testing Method of Drilling and Completion Fluids Damaging Oil Formation" on a JHMD-1 HTHP dynamic filter tester respectively. The results are shown in Table 2, wherein the original permeability values of the well cores used in the test refer to the initial values in Table 2.

TABLE 2

| Water-based drilling fluid | Well Core No. | Oleic Permeability/$10^{-3}$ $\mu m^2$ | | | Permeability Recovery Rate/% | |
|---|---|---|---|---|---|---|
| | | Initial Value | After Plugging | Plugging Ratio/% | After Damage | After End Face Cutting |
| F1 | 1 | 243.6 | 1 | 99.6 | 96.4 | 99.6 |
| F2 | 2 | 253.1 | 2.3 | 99.1 | 95.7 | 99.2 |
| F3 | 3 | 249.3 | 2.2 | 99.1 | 95.1 | 99.0 |
| DF1 | 4 | 251.7 | 62.2 | 75.3 | 80.6 | 84.4 |
| DF2 | 5 | 258.4 | 5.6 | 97.8 | 91.4 | 98.2 |
| DF3 | 6 | 246.7 | 4.4 | 98.2 | 92.4 | 98.2 |
| DF4 | 7 | 253.4 | 8.1 | 96.8 | 92.6 | 95.3 |
| DF5 | 8 | 249.5 | 6.5 | 97.4 | 93.1 | 96.2 |
| DF6 | 9 | 257.3 | 4.37 | 98.3 | 92.3 | 98.2 |
| DF7 | 10 | 252.8 | 4.7 | 98.1 | 92.8 | 98.3 |
| DF8 | 11 | 246.9 | 4.9 | 98.0 | 93.0 | 98.0 |
| DF9 | 12 | 248.9 | 5 | 98.0 | 92.8 | 97.6 |
| DF10 | 13 | 246.7 | 4.2 | 98.3 | 93.2 | 98.1 |
| DF11 | 14 | 253.8 | 4.6 | 98.2 | 92.9 | 98.2 |
| DF12 | 15 | 251.0 | 4 | 98.4 | 92.8 | 98.1 |
| DF13 | 16 | 245.2 | 4.7 | 98.0 | 93.1 | 98.0 |

It is seen from the data in Table 2: after the filtrate reducer and plugging agent for water-based drilling fluid used in oil and gas reservoir protection provided in the present invention is added into the water-based drilling fluid, the water-based drilling fluid attains a much better reservoir plugging effect and obtains higher permeability recovery capability, wherein the plugging ratio may be 99% or above, preferably 99.1% or above, apparently higher than the plugging ratio (75.3%) of the same water-based drilling fluid without the filtrate reducer and plugging agent provided in the present invention; in addition, the permeability recovery ratio may be 95% or above, preferably 99% or above, apparently higher than the permeability recovery ratio (84.4%) of the same water-based drilling fluid without the filtrate reducer and plugging agent for temperature-resistant calcium-resistant water-based drilling fluid used in oil and gas reservoir protection provided in the present invention.

While some preferred embodiments of the present invention are described above, the present invention is not limited to the specific details in those embodiments. Those skilled in the art can make various simple modifications and variations to the technical scheme of the present invention within the scope of the technical concept of the present invention. However, all those modifications and variations shall be deemed as falling into the scope of protection of the present invention.

In addition, it should be noted that the specific technical features described in above specific embodiments may be combined in any appropriate form, provided that there is no conflict among them. To avoid unnecessary repetition, various possible combinations are not described specifically in the present invention.

Moreover, different embodiments of the present invention may also be combined freely as required, as long as the combinations don't deviate from the ideal and spirit of the present invention. However, such combinations shall also be deemed as falling into the scope disclosed in the present invention.

What is claimed is:

1. A temperature-resistant calcium-resistant water-based drilling fluid for oil and gas reservoir protection containing a filtrate reducer and a plugging agent,
wherein the filtrate reducer is a copolymer that contains structural units represented by formula (1), structural units represented by formula (2), and structural units represented by formula (3), and the mass ratio of the structural units represented by formula (1) to the structural units represented by formula (2) to the structural units represented by formula (3) is (0.1-0.2):1:(0.05-0.1), and the number-average molecular weight of the copolymer is 10,000-100,000 g/mol;

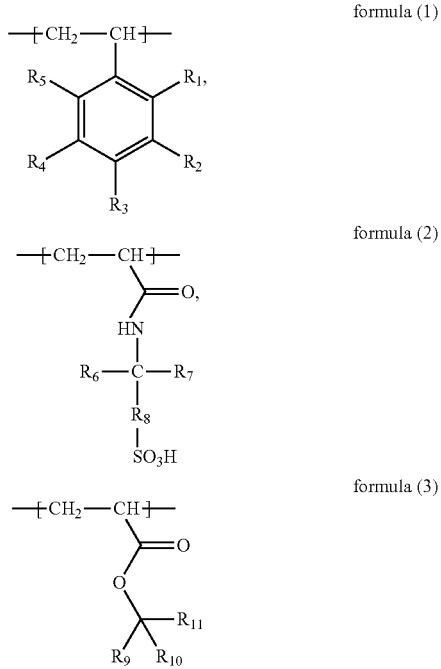

where, $R_1$, $R_2$, $R_3$, $R_4$, $R_5$, $R_6$, $R_7$, $R_9$, $R_{10}$, and $R_{11}$ are H, $C_1$-$C_4$ alkyl, or $C_1$-$C_4$ alkoxy respectively and independently, and $R_8$ is selected from $C_1$-$C_4$ alkylene;
the plugging agent is acrylamide-diallyldimethylammonium chloride copolymer modified graphene.

2. The water-based drilling fluid according to claim 1, wherein measured on the basis of 100 mL said water-based drilling fluid, the content of the filtrate reducer is 1-3 g, and the content of the plugging agent is 2-7 g.

3. The water-based drilling fluid according to claim 1, wherein in the filtrated reducer, $R_1$, $R_2$, $R_3$, $R_4$, $R_5$, $R_6$, $R_7$, $R_9$, $R_{10}$, and $R_{11}$ are H, methyl, ethyl, methoxy, or ethyoxy respectively and independently; $R_8$ is selected from methylene or ethylidene.

4. The water-based drilling fluid according to claim 1, wherein in the filtrate reducer, the mass ratio of the structural units represented by formula (1) to the structural units represented by formula (2) to the structural units represented by formula (3) is (0.1-0.15):1:(0.05-0.075).

5. The water-based drilling fluid according to claim 1, wherein in the acrylamide-diallyldimethylammonium chloride copolymer modified graphene, the molar ratio of structural units provided by acrylamide to structural units provided by diallyldimethylammonium chloride is 1:(5-15), and the number-average molecular weight of the acrylamide-diallyldimethylammonium chloride copolymer is 15,000-30,000 g/mol.

6. The water-based drilling fluid according to claim 1, wherein the acrylamide-diallyldimethylammonium chloride copolymer modified graphene is prepared by the following method: dispersing graphene oxide by ultrasonic dispersion in water to obtain dispersion liquid, and controlling the dispersion liquid to react with acrylamide-diallyldimethylammonium chloride copolymer and hydrazine hydrate.

7. The water-based drilling fluid according to claim 6, wherein in the preparation process of the acrylamide-diallyldimethylammonium chloride copolymer modified graphene, the dosed weight ratio of the graphene oxide to the acrylamide-diallyldimethylammonium chloride copolymer to the hydrazine hydrate is 1:(4.8-5.3):(60-80).

8. The water-based drilling fluid according to claim 6, wherein in the preparation process of the acrylamide-diallyldimethylammonium chloride copolymer modified graphene, the concentration of graphene oxide in the dispersion liquid is 0.5-2.2 mg/mL.

9. The water-based drilling fluid according to claim 6, wherein the acrylamide-diallyldimethylammonium chloride copolymer is added in a form of solution, and the concentration of the acrylamide-diallyldimethylammonium chloride copolymer solution is 0.4-0.6 wt %.

10. The water-based drilling fluid according to claim 6, wherein in the preparation process of the acrylamide-diallyldimethylammonium chloride copolymer modified graphene, the process of the reaction comprises: adding the acrylamide-diallyldimethylammonium chloride copolymer in a form of solution into the dispersion liquid and stirring for 15-50 min. first, and then adding the hydrazine hydrate to obtain a mixture, and controlling the mixture to have reaction for 1-10 h in a water bath at 65-95° C. constant temperature.

* * * * *